(12) United States Patent
Gomez

(10) Patent No.: US 7,445,047 B2
(45) Date of Patent: Nov. 4, 2008

(54) METAL-TO-METAL NON-ELASTOMERIC SEAL STACK

(75) Inventor: Alfredo Gomez, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 295 days.

(21) Appl. No.: 11/256,888

(22) Filed: Oct. 24, 2005

(65) Prior Publication Data

US 2007/0089887 A1    Apr. 26, 2007

(51) Int. Cl.
E21B 34/14    (2006.01)

(52) U.S. Cl. .................. 166/334.4; 166/332.4; 277/342

(58) Field of Classification Search .................. 277/327, 277/342, 603, 608, 609, 625, 530, 647; 166/332.4, 166/332.7, 334.4, 386
See application file for complete search history.

(56) References Cited

U.S. PATENT DOCUMENTS

| | | | | | |
|---|---|---|---|---|---|
| 3,833,228 | A | * | 9/1974 | Gilliam, Sr. .................. | 277/530 |
| 3,869,132 | A | * | 3/1975 | Taylor et al. ................. | 277/608 |
| 4,406,469 | A | * | 9/1983 | Allison ........................ | 277/342 |
| 4,658,847 | A | * | 4/1987 | McCrone ..................... | 137/72 |
| 4,811,959 | A | * | 3/1989 | Bullard et al. ............... | 277/342 |
| 5,105,879 | A | * | 4/1992 | Ross .......................... | 166/195 |
| 5,156,220 | A | * | 10/1992 | Forehand et al. ............ | 166/386 |
| 5,297,805 | A | * | 3/1994 | Merkin et al. ................ | 277/322 |
| 5,309,993 | A | * | 5/1994 | Coon et al. .................. | 166/115 |
| 5,593,166 | A | * | 1/1997 | Lovell et al. ................. | 277/516 |
| 5,799,953 | A | * | 9/1998 | Henderson ................... | 277/554 |
| 6,318,729 | B1 | * | 11/2001 | Pitts et al. .................... | 277/511 |
| 6,497,416 | B1 | * | 12/2002 | Morvant ...................... | 277/602 |
| 6,661,826 | B2 | * | 12/2003 | Ujazdowski et al. .......... | 372/55 |
| 2002/0074739 | A1 | * | 6/2002 | Mattina et al. ............... | 277/603 |
| 2003/0056951 | A1 | * | 3/2003 | Kaszuba ................. | 166/250.01 |
| 2003/0222410 | A1 | * | 12/2003 | Williams et al. ............ | 277/619 |
| 2007/0105067 | A1 | * | 5/2007 | Hayashi et al. ............. | 433/172 |

FOREIGN PATENT DOCUMENTS

| | | | |
|---|---|---|---|
| GB | 2202283 | A | 9/1988 |
| GB | 2202283 | A * | 9/1988 |
| GB | 2358419 | A | 7/2001 |
| GB | 2358419 | A * | 7/2001 |

* cited by examiner

*Primary Examiner*—David J Bagnell
*Assistant Examiner*—David Andrews
(74) *Attorney, Agent, or Firm*—Shawn Hunter

(57) ABSTRACT

An improved seal assembly for use in sliding sleeve valves. The seal assembly incorporates a number of annular, chevron-shaped seal elements that are in a stacked configuration and preferably formed of a thermoplastic material to provide a fluid seal between the outer housing and the inner sleeve member of the sliding sleeve valve. In addition, the seal assembly preferably includes a pair of annular metallic seal members that have a C-ring cross-section (a "C-seal"). On opposite axial sides of each metallic C-seal are a C-seal support ring and an end adapter that are shaped and sized to assist the metallic C-seals to be axially compressed and uncompressed to resiliently seal against both the inner sleeve member and the outer housing.

20 Claims, 3 Drawing Sheets

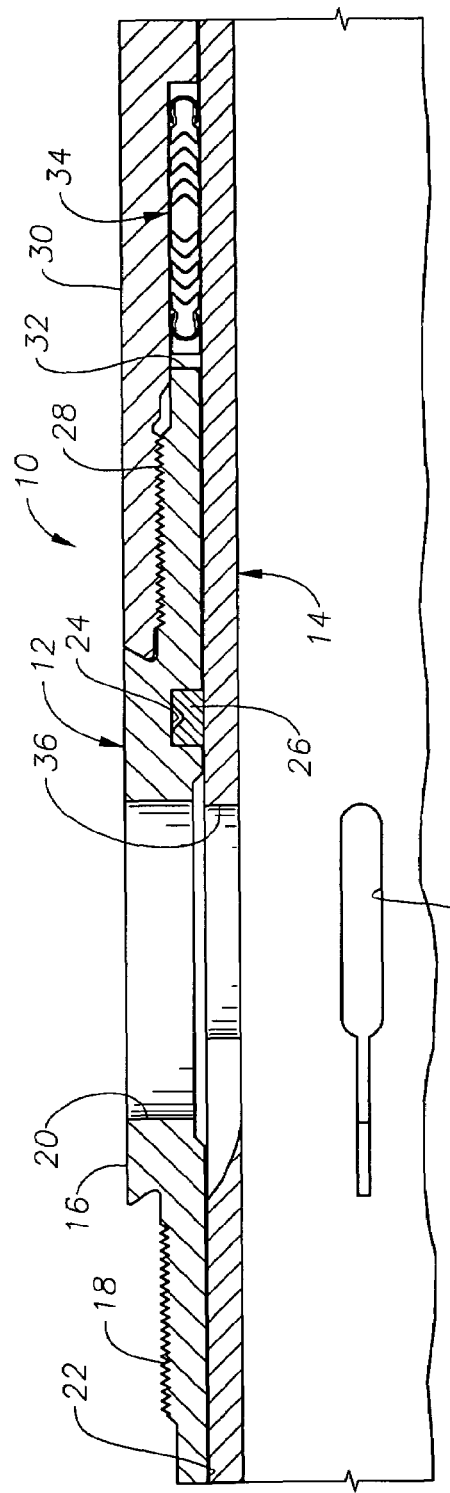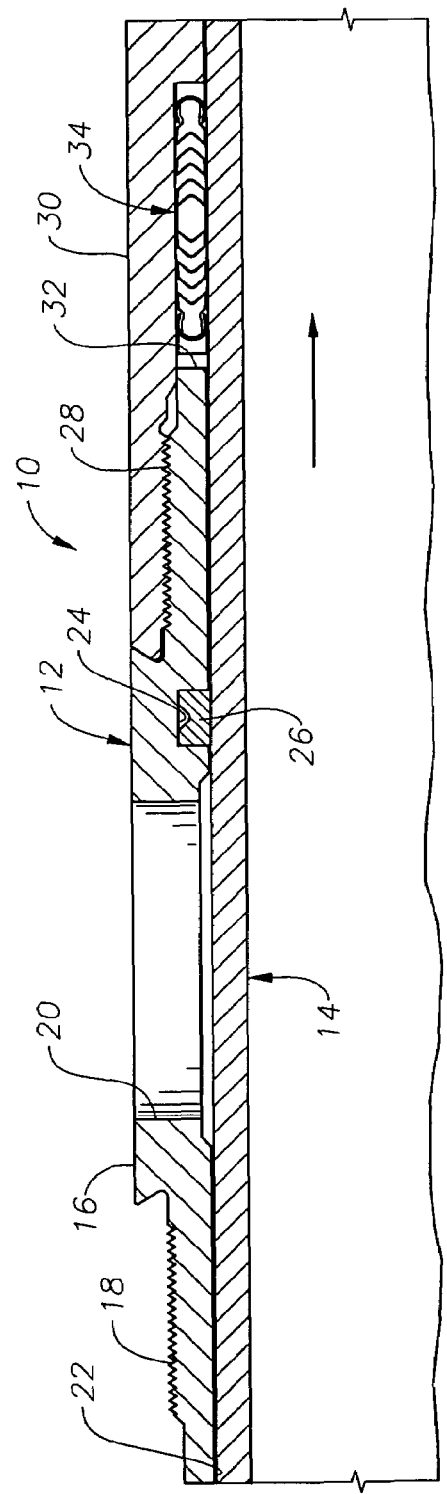

METAL-TO-METAL NON-ELASTOMERIC SEAL STACK

BACKGROUND OF THE INVENTION

1. Field of the Invention

The invention relates generally to sliding sleeve devices of the type used within a wellbore, and more particularly, the design of seals used within a sliding sleeve device.

2. Description of the Related Art

Sliding sleeve devices are used to allow selective fluid communication between a flowbore and a surrounding annulus in a wellbore. Typically, there devices are used as valves that are selectively opened and/or closed to accomplish a particular function within the wellbore. One typical use for such valves is to inject chemical inhibitors, stimulants, or the like into the annulus from the flowbore. During the production phase, sliding sleeve valves are often used to control the amount of flow of production fluid from the annulus into the flowbore. Many other uses for these devices are known in the art.

Conventional sliding sleeve devices include an outer housing with at least one lateral fluid flow port disposed therein. A sleeve member is disposed interiorly of the housing and is shiftable between first and second positions for selectively communicating and isolating the fluid communication port relative to the interior of the tool. The sleeve member may be shifted hydraulically, by use of a shifting tool, or using other techniques known in the art. Typically, sets of seals are located on one or both axial sides of the fluid flow port(s) to form a fluid seal between the sleeve member and the housing. These seals are important because they prevent leakage into or out of the valve device while the sleeve valve is closed. In many conventional valve designs, the seals are stacked sets of chevron-shaped seal members formed of thermoplastic material. An example of a conventional seal set is described in U.S. Pat. No. 5,309,993, issued to Coon et al. This patent is owned by the assignee of the present invention and is hereby incorporated by reference. The use of thermoplastic materials allows the seal members to flex and bend slightly so as to effect a better fluid seal, as is described in detail in U.S. Pat. No. 5,309,993.

Although standard thermoplastic seals work well for most applications, technology has continued to develop to allow oil drilling to occur at deeper intervals and consequently higher pressures and temperatures. Limitations on the use of sliding sleeve devices at these lower depths are imposed by the increased pressures and temperatures upon the seals. In applications where there is a high pressure differential between the interior flowbore and the surrounding annulus, opening and closing of the sleeve valve will degrade the seals. As the sleeve is shifted from a closed position to an open position, or vice versa, fluid will pass through the flow port(s) under great pressure and try to pass between the sleeve member and the outer housing. The thermoplastic seal members will become subjected to great erosional forces, and tend to wear away. After repeated use in such conditions, the seals may become useless.

Some contemporary seal designs have added a diffuser ring to the sleeve valve to help reduce the velocity of fluid passing through the flow port(s) as the sleeve member is being shifted between open and closed positions. An example of this type of diffuser ring is described in U.S. Pat. No. 5,309,993, issued to Coon et al. While the diffuser ring is useful, it does not completely solve the problem of erosion of the thermoplastic seal members.

The present invention addresses the problems of the prior art.

SUMMARY OF THE INVENTION

The invention provides an improved seal assembly for use in sliding sleeve valves. The seal assembly incorporates a number of annular, chevron-shaped seal elements that are in a stacked configuration. The seal elements are preferably formed of a thermoplastic material and provide a fluid seal between the outer housing and the inner sleeve member of the sliding sleeve valve. In addition, the seal assembly preferably includes a pair of annular metallic seal members that have a C-ring cross-section (a "C-seal"). On opposite axial sides of each metallic C-seal are a C-seal support ring and an end adapter that are shaped and sized to assist the metallic C-seals to be axially compressed and uncompressed to resiliently seal against both the inner sleeve member and the outer housing.

In operation, the thermoplastic seal elements of the seal assembly form a dynamic fluid seal against both the outer housing and the inner sleeve member. Also, resilient metal-to-metal contact is provided by the C-seal portions of the seal system against both the outer housing and the sleeve member. The metallic construction of the C-seals provides erosion resistance and protection for the thermoplastic components of the seal system. Additionally, the metallic C-seals and their particular construction help the seal system to act as a fluid diffuser during opening and closing of the sleeve valve.

The present invention provides a seal system that allows a sleeve valve to be operated at greater temperatures and pressures than conventional sliding sleeves. In addition, the present invention provides a sliding sleeve valve that is more robust than conventional sleeve valve assemblies and provides a greater operational life.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

FIG. 1 is a side, quarter cross-sectional view of an exemplary sliding sleeve valve incorporating a seal assembly constructed in accordance with the present invention and in an open position to allow fluid communication across the valve.

FIG. 2 is a side, quarter cross-sectional view of the sleeve valve shown in FIG. 1, now in a closed configuration.

DETAILED DESCRIPTION OF THE PREFERRED EMBODIMENTS

Figure 3:
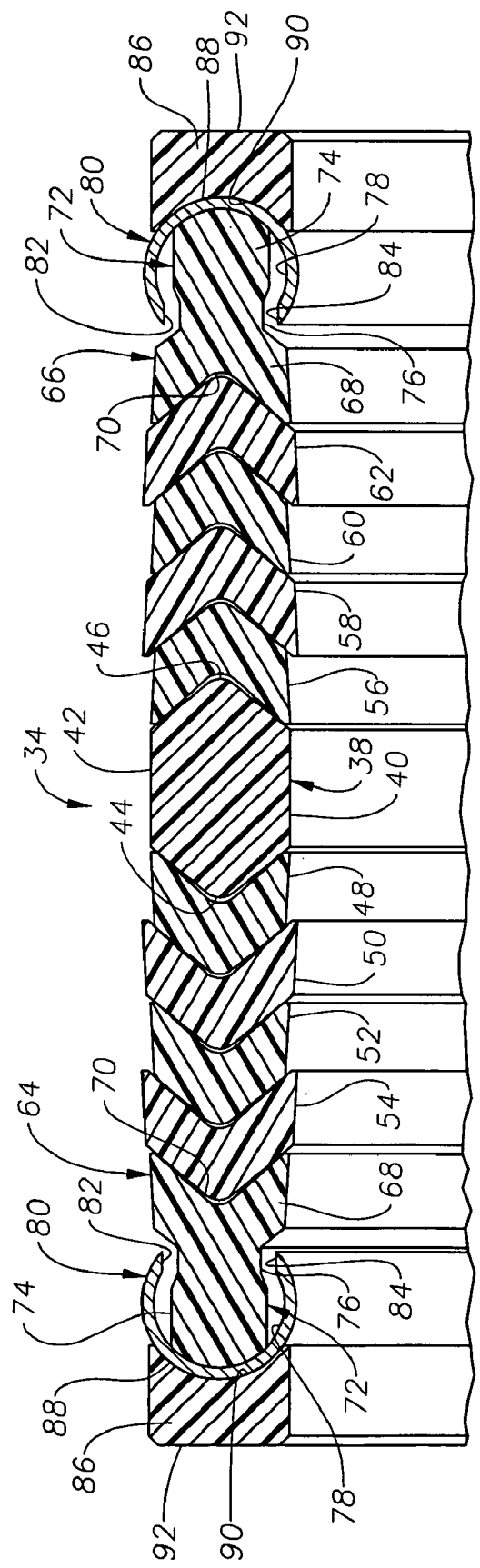
FIG. 3 is a side, cross-sectional view of an exemplary seal assembly constructed in accordance with the present invention.

FIGS. 1 and 2 illustrate an exemplary sliding sleeve valve 10. The sleeve valve 10 includes a tubular outer housing 12 and an inner sleeve member 14 that is axially movable with respect to the outer housing 12 between open, circulating and closed positions, as is known in the art. The outer housing 12 includes an upper sub 16 having a threaded end portion 18 for interconnection with other portions of a production string (not shown) in a manner known in the art. A lateral fluid flow port 20 is disposed through the upper sub 16 to allow fluid communication between the exterior of the upper sub 16 and the axial flowbore 22 that is defined therewithin. Below the flow port 20 is an internal annular recess 24, which retains a diffuser ring 26 therein. The diffuser ring 26 acts to slow fluid flow rate into or out of the valve 10 during opening or closing to help prevent damage to the seal assembly 34. The diffuser ring 26 is preferably of the type described in U.S. Pat. No. 5,156,220, issued to Forehand et al. This patent is owned by the assignee of the present invention and is hereby incorporated by reference.

The upper sub 16 is secured by threaded connection 28 to a lower sub 30. An annular seal gland 32 is defined within the radial interior of the sub 16. Seal assembly 34 is disposed within the seal gland 32. The structure and operation of the seal assembly 34 will be described in greater detail shortly.

The inner sleeve member 14 has one or more lateral flow passages 36 that are disposed through the sleeve member 14. In FIG. 1, the sleeve valve 10 is in an open configuration wherein the sleeve member 14 is disposed axially within the outer housing 12 such that the lateral fluid flow passages 36 are substantially aligned with the outerfluid flow port(s) 20 so that fluid may be communication from the exterior of the outer housing, in through both port(s) 20 and passages 36 and the interior flowbore 22 of the valve 10. In FIG. 2, the inner sleeve member 14 has been axially shifted to the closed configuration, so that the lateral fluid passages 36 of the inner sleeve member 14 are no longer aligned with the outer fluid flow port(s) 20 and the fluid seal created by the seal assembly 34 will effectively prevent fluid communication between the port(s) 20 and the passages 36. In the closed position, fluid communication between the inner flowbore 22 and the exterior of the valve 10 is blocked.

Figure 4:
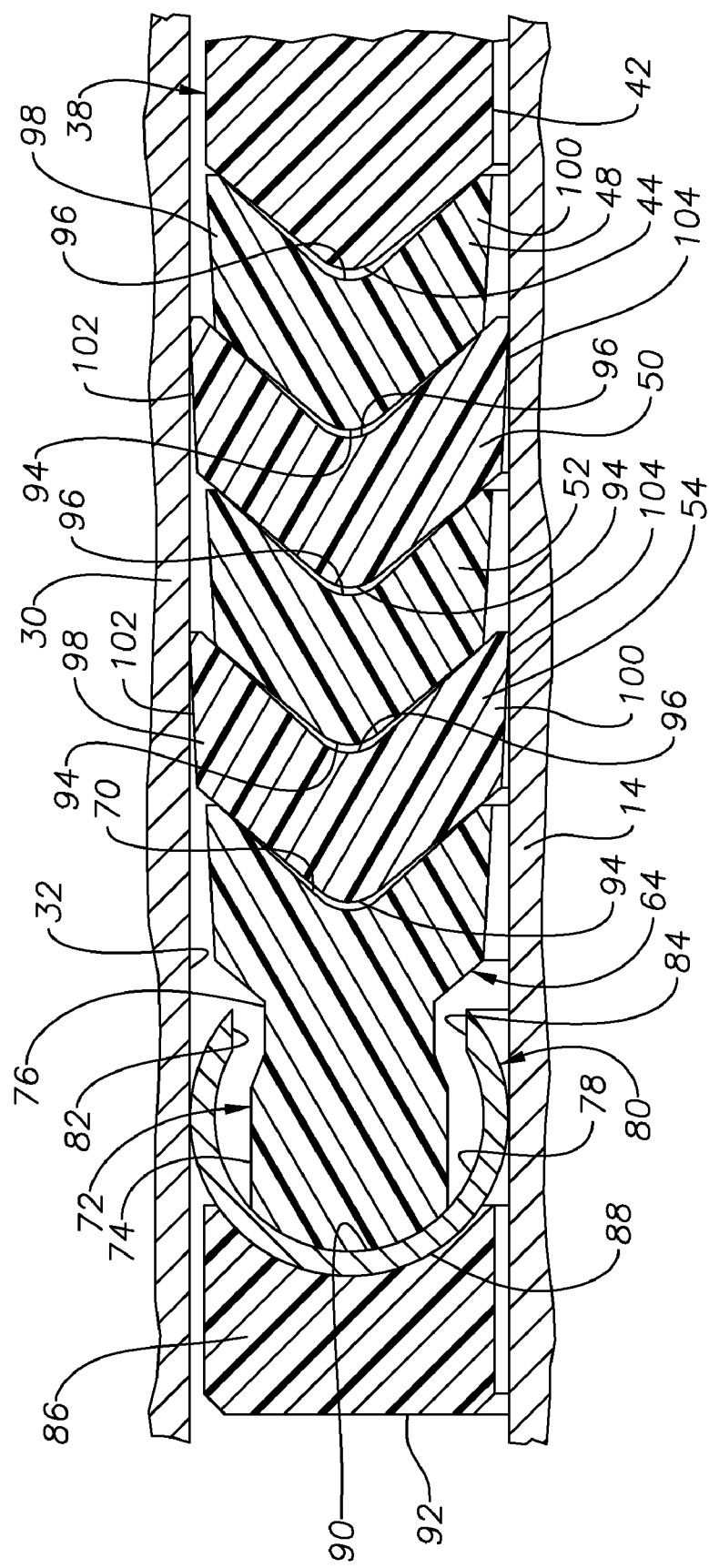
FIG. 4 is an enlarged view of portions of the seal assembly of FIG. 3.

Referring now to FIGS. 3 and 4, the structure and operation of the seal assembly 34 is described in greater detail. The seal assembly 34 provides bidirectional fluid sealing and is similar in many respects to the chevron seal described in U.S. Pat. No. 5,309,993. In FIG. 3, it can be seen that the seal assembly 34 includes an annular center ring adapter 38 that presents inner and outer radial side surfaces 40, 42. The axial sides of the center ring adapter 38 present axial nose portions 44, 46. Chevron seals 48, 50, 52, and 54 are stacked upon the nose portion 44, and chevron seals 56, 58, 60, and 62 are stacked upon the nose portion 46. The chevron seals 48, 50, 52, 54, 56, 58, 60, and 62 are plastically deformable members that are preferably fashioned of a thermoplastic material. Suitable thermoplastic materials for use in this application include polyetheretherkeytone (PEEK) and polytetrafluoroethylene, although other suitable thermoplastic materials may be used. The chevron seals 48, 50, 52, 54, 56, 58, 60, and 62 are also preferably of the type described in U.S. Pat. No. 5,309,993, issued to Coon et al.

C-seal support rings 64, 66 are in contact with each of the outermost chevron seals 54 and 62, respectively. The C-seal support rings 64, 66 each include an enlarged diameter portion 68 which presents an axial side surface 70 that is V-shaped. Each of the C-seal support rings 64, 66 also features a reduced diameter portion 72 that extends axially outwardly from the enlarged diameter portion 68. The radially reduced portion 72 includes a head portion 74 and a radially reduced recess 76 located between the head portion 74 and the enlarged diameter portion 68.

The head portion 74 of the C-seal support rings 64, 66, contacts the interior surface 78 of a C-seal ring 80. The C-seal ring 80 is preferably fashioned from a non-elastomeric material, and more preferably, a metal that has high strength and durability. A currently preferred metal for the C-seal is 718 Inconel. The C-seal ring 80 has a C-shaped cross-section, as illustrated in FIGS. 3 and 4. The C-seal ring has shape-memory and is able to be radially compressed such that the edge portions 82, 84 of the ring 80 may be urged into the recess 76 of the C-seal support rings 64, 66. The C-seal ring 80 is preferably coated with a surface plating of a friction-resistant material. The friction-resistant material may be any of a number of known friction-resistant substances, including Teflon®.

An end adapter backup ring 86 is disposed in contact with the outer surface 90 of each of the C-seal support rings 64, 66. The end adapter backup rings 86 are preferably formed of a thermoplastic material to provide a resilient cushion between the C-seal rings 80 and the end wall surfaces of the seal gland 32. The backup rings 86 present a first curved axial surface 90 that is shaped and sized to abut the curved outer surface 88 of the C-seal rings 80. The backup rings 86 also present a second axial surface 92 that is substantially flat for contacting the end surfaces of the seal gland 32 in a flush manner.

FIG. 4 provides an illustration of the manner of sealing that is provided by the seal assembly 34. While only half of the sealing assembly 34 is shown in FIG. 4, it will be understood that the other half of the seal assembly 34 will function in the same manner. As depicted, alternate chevron seals 50 and 54 are placed into sealing contact with the lower sub 30 and the sliding sleeve member 14. In addition, the C-seal rings 80 are also in sealing contact with both the lower sub 30 and the sleeve member 14. This creates a metal-to-metal seal between the seal assembly 34 and both the sleeve member 14 and the outer housing 12.

In operation, the seal assembly 34 provides a dynamic seal between two moving surfaces formed by the sleeve member 14 and the lower sub 30. The chevron seals 50, 54 are urged into this sealing contact as the nose portions 94 of the neighboring chevron seals 48 and 52 are wedged into the V-shaped axial surfaces 96 of the seals 50, 54. Each of the chevron seals 48, 50, 52, 54 has a pair of dynamic wing portions 98, 100 that extend outwardly and rearwardly from the nose portion 94. The wing portions 98, 100 define an acute angle with respect to one another and present sealing surfaces 102, 104 that (in the instances of seals 50 and 54) provide a fluid seal against the lower sub 30 and the sleeve member 14, respectively. The semi-rigid nature of the thermoplastic material making up the chevron seals 50, 54 will permit a resilient seal to be made against the sleeve member 14 even while the sleeve member 14 is being axially shifted.

The C-seal rings 80 provide protection to the internal chevron seals 48, 50, 52, 54, 56, 58, 60, 62 and the C-seal support rings 64, 66 from erosion and wear resulting from wellbore fluids passing through the flow ports 20, 36 under high pressures and temperatures. Such fluids tend to migrate in between the outer housing 12 and the sliding sleeve member 14 when the valve 10 is moved between opened and closed configurations. When the differential pressure across the valve is very high, the fluid will begin to erode the thermoplastic elements of conventional seals very quickly. The erosion process is accelerated as well when the fluids are of increased temperature. The non-elastomeric C-seal rings 80 help to protect the interior thermoplastic elements of the seal assembly from fluid erosion by serving as a protective barrier. Additionally, passage of the fluid between the C-seal rings 80 and the surfaces of the outer housing 12 and sleeve member 14 will act to reduce the velocity of the fluid before it reaches the interior chevron seal components 48, 50, 52, 54, 56, 58, 60, 62. Thus, the C-seal components 80 of the seal assembly 34 will help to act as a fluid diffuser element during opening and closing of the valve 10. The C-seal rings 80 also help prevent extrusion of thermoplastic components out of the seal gland 32.

The seal assembly 34 provides an axially bidirectional fluid seal. There is a metal-to-metal seal established proximate each axial end of the seal assembly 34. The flow rate of fluid passing from left to right in FIG. 3, for example, will be slowed down by the C-seal ring 80 that is adjacent the back-up ring 64, thus protecting the interior chevron seals 48, 50, 52, 54, 56, 58, 60, 62 from erosion. Conversely, if fluid were passing from right to left in FIG. 3, the interior chevron seals 48, 50, 52, 54, 56, 58, 60, 62 would be protected from erosion damage by the C-seal ring 80 that is adjacent the back-up ring 66.

In practice, the seal assembly 34 will provide a more durable and longer-lasting seal over a greater range of pressures and temperatures, thereby improving the ability of the valve 10 to operate in an effective manner. The thermoplastic elements provide fluid sealing at lower pressures and temperatures. At higher pressures and temperatures, exceeding the rating of the thermoplastic materials, the C-seal rings 80 will provide sealing. Pressurized fluid in and around the seal assembly 34 will tend to reinforce the metal-to-metal sealing by acting upon the inner surfaces 78 of the C-seal rings 80. This fluid pressure will urge the C-seal rings 80 toward a radially expanded condition that will provide a stronger fluid seal.

Those of skill in the art will understand that the seal assembly 34 is useful within a wide variety of sliding sleeve devices, including the "CM" and "HCM"-type sleeves that are sold commercially by Baker Oil Tools of Houston, Texas. Those of skill in the art will recognize that numerous modifications and changes may be made to the exemplary designs and embodiments described herein and that the invention is limited only by the claims that follow and any equivalents thereof.

What is claimed is:

1. A seal assembly for use in a wellbore tool having a housing and a member that is to be sealed with respect to the housing, the seal assembly comprising:
   an annular chevron seal member having a chevron-shaped cross-section with a pair of dynamic wing portions with sealing surfaces for forming a sealing engagement with the housing and the member;
   a non-elastomeric C-seal ring having a generally C-shaped cross-section; and
   an end adapter backup ring in contact with an outer radial surface of the C-seal ring for cushioning the C-seal ring into contact with external components;
   an annular C-seal support ring disposed between the chevron seal and the C-seal ring, the C-seal support ring comprising:
      an enlarged diameter portion having a generally V-shaped surface for abutting the chevron seal; and
      a reduced diameter portion for abutting an interior surface of the C-seal, the reduced diameter portion having a recess for receiving axial ends of the C-seal ring cross-section when the C-seal ring is axially compressed.

2. The seal assembly of claim 1 wherein the chevron seal is comprised of thermoplastic material.

3. The seal assembly of claim 1 wherein the C-seal ring is comprised of metal.

4. The seal assembly of claim 1 wherein the C-seal ring has an outer plating of friction-resistant material.

5. The seal assembly of claim 4 wherein the friction-resistant material comprises polytetrafluoroethylene coating.

6. The seal assembly of claim 1 wherein there are multiple chevron seal members that are arranged in a stacked configuration.

7. The seal assembly of claim 1 wherein the wellbore tool is a sliding sleeve valve, the housing is a sleeve valve housing, and the member that is to be sealed comprises a sleeve that is axially moveable with respect to the sleeve valve housing.

8. A sliding sleeve device for use within a wellbore, the device comprising:
   a tubular housing defining a flowbore;
   a sleeve that is moveable with respect to the housing and to be sealed with respect to the housing;
   a seal assembly forming a fluid seal with both the housing and the sleeve, the seal assembly comprising:
   1) a thermoplastic sealing component having sealing surfaces for forming fluid seals against both the housing and the sleeve; and
   2) a metallic sealing component forming a fluid seal against both the housing and the sleeve; and
   an end adapter backup ring in contact with the metallic sealing component for cushioning the metallic sealing component into contact with portions of the housing.

9. The device of claim 8 wherein the metallic sealing component comprises an annular C-seal ring member having a generally C-shaped cross-section.

10. The device of claim 8 wherein the thermoplastic sealing component comprises:
    an annular center ring adapter having inner and outer radial side surfaces and first and second axial nose portions;
    a first plurality of annular chevron seals disposed in a stacked configuration and in contact with the first axial nose portion;
    a second plurality of annular chevron seals disposed in a stacked configuration and in contact with the second axial nose portion.

11. The device of claim 8 further comprising an annular C-seal support ring disposed between the housing and the sleeve, the C-seal support ring comprising
    an enlarged diameter portion having a generally V-shaped surface for abutting the chevron seal; and
    a reduced diameter portion for abutting an interior surface of the C-seal, the reduced diameter portion having a recess for receiving axial ends of the C-seal ring cross-section when the C-seal ring is axially compressed.

12. The device of claim 8 wherein the metallic sealing component has an outer plating of friction-resistant material.

13. The device of claim 12 wherein the friction-resistant material comprises polytetrafluoroethylene coating.

14. The device of claim 8 wherein the thermoplastic sealing component is comprised of polyethretherkeytone.

15. A sliding sleeve device for use within a wellbore, the device comprising:
    a tubular housing defining a flowbore;
    a sleeve that is moveable with respect to the housing and to be sealed with respect to the housing;
    a seal assembly forming a fluid seal with both the housing and the sleeve, the seal assembly comprising:
    1) a thermoplastic sealing component having sealing surfaces for forming fluid seals against both the housing and the sleeve; and
    2) a metallic sealing component forming a fluid seal against both the housing and the sleeve, the metallic sealing component comprising an annular C-seal ring member; and
    an end adapter backup ring in contact with the metallic sealing component for cushioning the metallic sealing component into contact with portions of the housing.

16. The sliding sleeve device of claim 15 wherein the thermoplastic sealing component comprises:

an annular center ring adapter having inner and outer radial side surfaces and first and second axial nose portions;

a first plurality of annular chevron seals disposed in a stacked configuration and in contact with the first axial nose portion;

a second plurality of annular chevron seals disposed in a stacked configuration and in contact with the second axial nose portion.

17. The sliding sleeve device of claim 15 further comprising an annular C-seal support ring disposed between the housing and the sleeve, the C-seal support ring comprising an enlarged diameter portion having a generally V-shaped surface for abutting the chevron seal; and a reduced diameter portion for abutting an interior surface of the C-seal, the reduced diameter portion having a recess for receiving axial ends of the C-seal ring cross-section when the C-seal ring is axially compressed.

18. The sliding sleeve device of claim 15 wherein the metallic sealing component has an outer plating of friction-resistant material.

19. The sliding sleeve device of claim 18 wherein the friction-resistant material comprises polytetrafluoroethylene coating.

20. The sliding sleeve device of claim 15 wherein the thermoplastic sealing component is comprised of polyethretherkeytone.

* * * * *

UNITED STATES PATENT AND TRADEMARK OFFICE
CERTIFICATE OF CORRECTION

PATENT NO. : 7,445,047 B2  Page 1 of 1
APPLICATION NO. : 11/256888
DATED : November 4, 2008
INVENTOR(S) : Alfredo Gomez It is certified that error appears in the above-identified patent and that said Letters Patent is hereby corrected as shown below:

Column 6, line 48, the word "polyethretherkeytone" should be change to --polyetheretherkeytone--.

Column 8, lines 12-13, the word "polyethretherkeytone" should be changed to --polyetheretherkeytone--.

Signed and Sealed this

Twenty-fourth Day of February, 2009

JOHN DOLL
*Acting Director of the United States Patent and Trademark Office*